(12) United States Patent
Yokota

(10) Patent No.: US 8,743,216 B2
(45) Date of Patent: Jun. 3, 2014

(54) COMMUNICATION SYSTEM, IMAGE OUTPUT APPARATUS, COMMUNICATION PROCESSING METHOD THEREOF, AND COMPUTER-READABLE STORAGE MEDIUM

(75) Inventor: Akane Yokota, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 655 days.

(21) Appl. No.: 13/060,515

(22) PCT Filed: Oct. 14, 2009

(86) PCT No.: PCT/JP2009/068086
§ 371 (c)(1),
(2), (4) Date: Feb. 24, 2011

(87) PCT Pub. No.: WO2010/050385
PCT Pub. Date: May 6, 2010

(65) Prior Publication Data
US 2011/0149092 A1 Jun. 23, 2011

(30) Foreign Application Priority Data
Oct. 29, 2008 (JP) ................... 2008-278613

(51) Int. Cl.
*H04N 5/225* (2006.01)
(52) U.S. Cl.
USPC ...................................... 348/207.1
(58) Field of Classification Search
USPC ...................................... 348/207.1
See application file for complete search history.

(56) References Cited

U.S. PATENT DOCUMENTS

| 7,852,503 B2* | 12/2010 | Iwami et al. | 358/1.15 |
| 8,085,413 B2* | 12/2011 | Yamada et al. | 358/1.13 |
| 2004/0070672 A1* | 4/2004 | Iwami et al. | 348/207.2 |
| 2004/0179103 A1* | 9/2004 | Endo et al. | 348/207.2 |
| 2004/0210691 A1 | 10/2004 | Fujii | |
| 2005/0140789 A1* | 6/2005 | Yasuda | 348/207.2 |
| 2006/0025181 A1 | 2/2006 | Kalofonos et al. | |
| 2006/0126102 A1* | 6/2006 | Sakuda | 358/1.15 |
| 2006/0285155 A1* | 12/2006 | Yamada et al. | 358/1.15 |

(Continued)

FOREIGN PATENT DOCUMENTS

| CN | 1487724 A | 4/2004 |
| JP | 2004-025590 A | 1/2004 |

(Continued)

OTHER PUBLICATIONS

Jan. 19, 2010 International Search Report and Written Opinion in PCT/JP2009/068086.

*Primary Examiner* — James Hannett
(74) *Attorney, Agent, or Firm* — Fitzpatrick, Cella, Harper & Scinto

(57) ABSTRACT

In a communication system including a plurality of image supply apparatuses and an image output apparatus, If communication with a first image supply apparatus using a first protocol is disconnected before completion of output processing of an image supplied from the first image supply apparatus under communication control by a second communication control unit which controls communication relating to an image using a second protocol, and a second image supply apparatus requests a connection, the image output apparatus establishes a connection of communication with the second image supply apparatus using the first protocol and holds a connection to the second image supply apparatus using the second protocol until the completion of the output processing of the image.

14 Claims, 13 Drawing Sheets

(56) References Cited

U.S. PATENT DOCUMENTS

| | | |
|---|---|---|
| 2007/0011679 A1* | 1/2007 | Abe .............................. 718/100 |
| 2007/0149124 A1 | 6/2007 | Onozawa |
| 2007/0162949 A1* | 7/2007 | Nitta et al. .................... 725/134 |
| 2011/0069187 A1 | 3/2011 | Yokota |

FOREIGN PATENT DOCUMENTS

| | | |
|---|---|---|
| JP | 2004-129218 A | 4/2004 |
| JP | 2004-237713 A | 8/2004 |
| JP | 2004-322420 A | 11/2004 |
| JP | 2006-094376 A | 4/2006 |

\* cited by examiner

F I G. 1
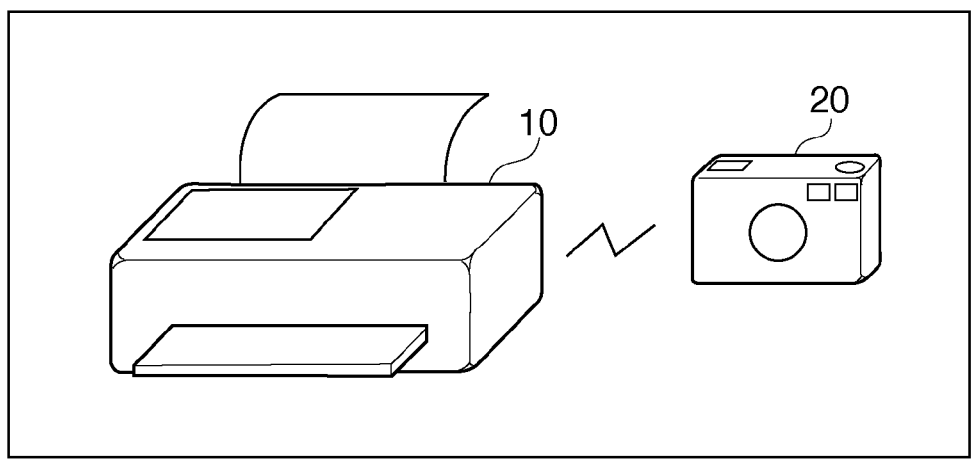

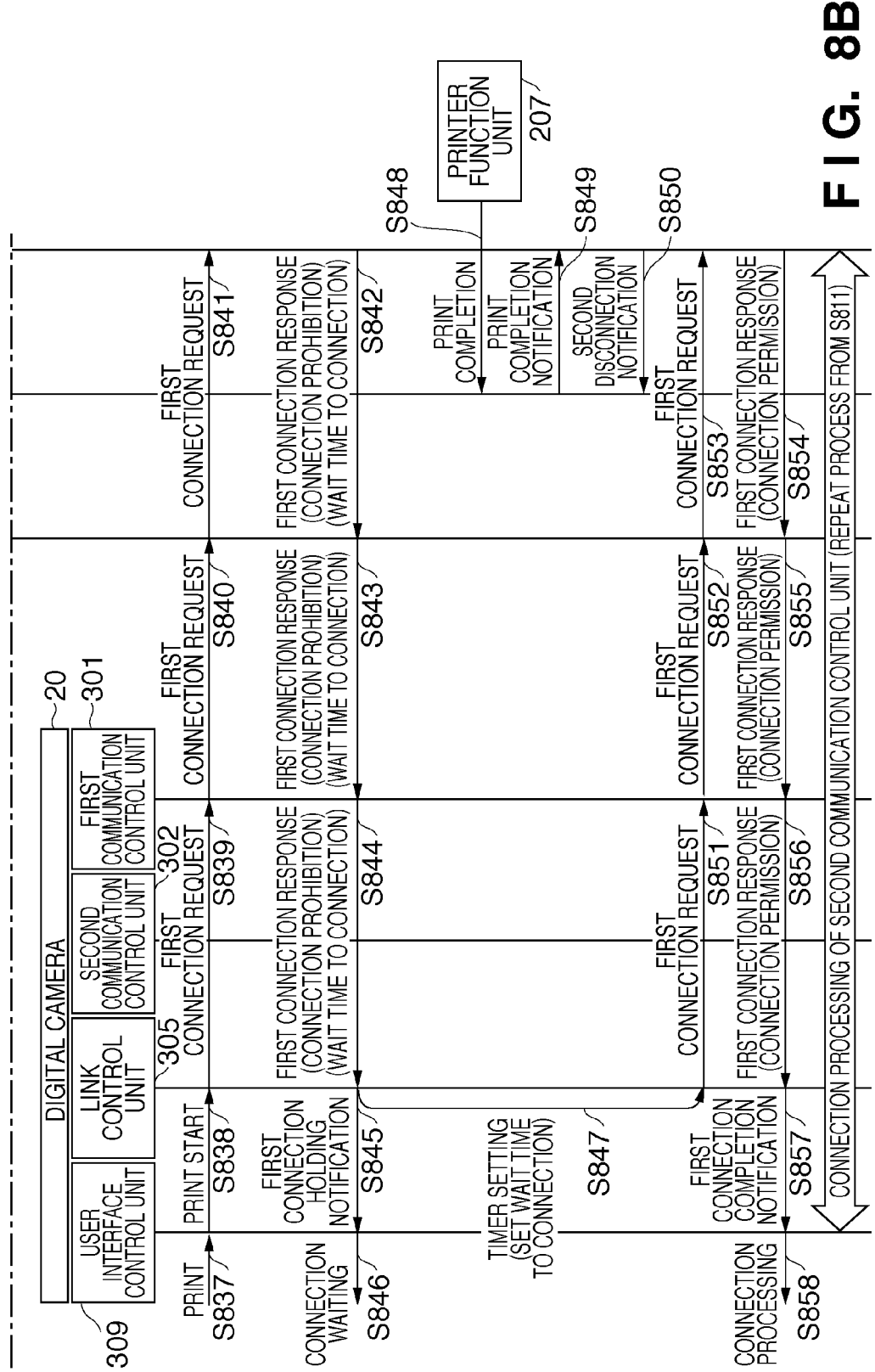

F I G. 10A
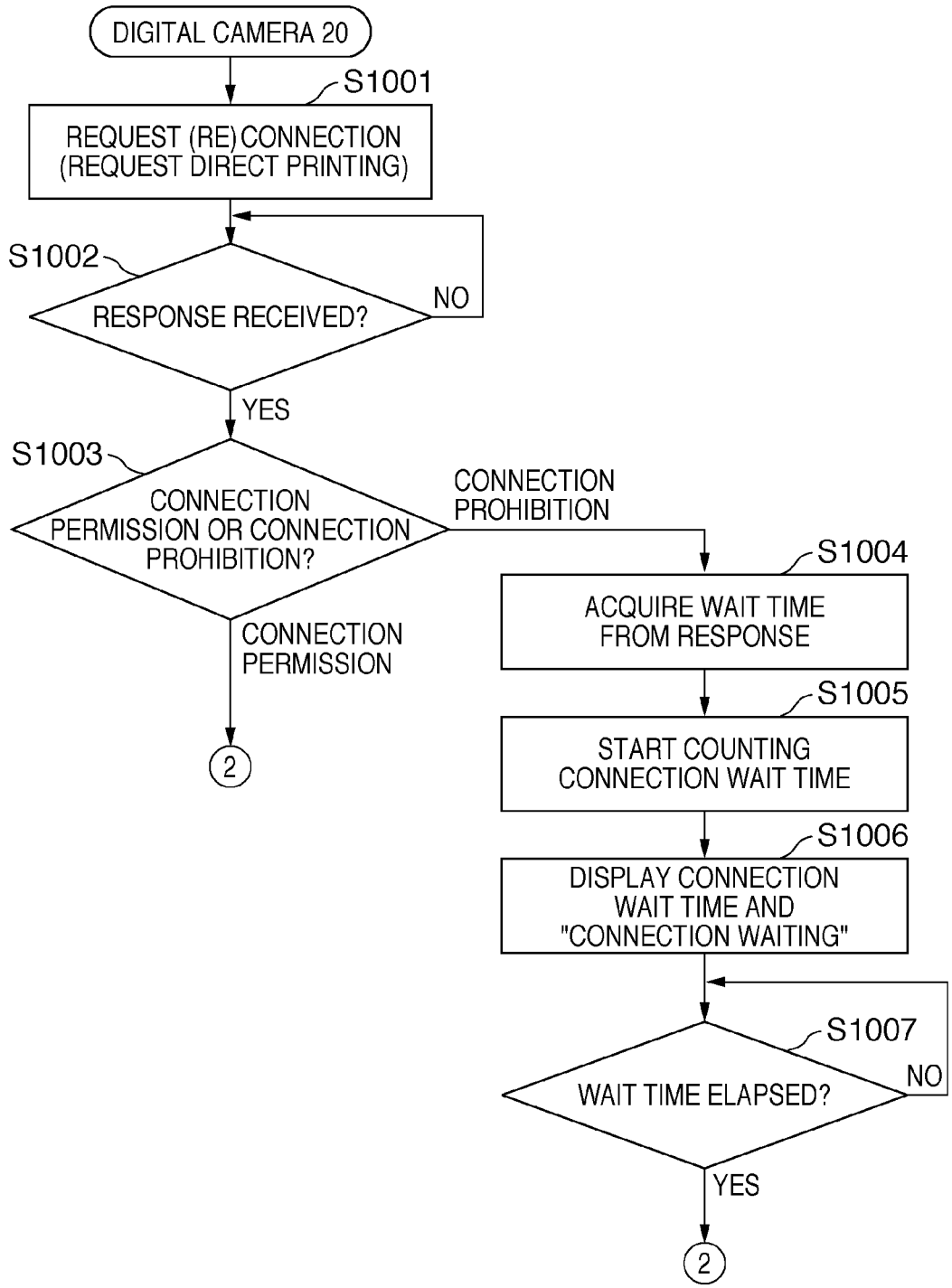

COMMUNICATION SYSTEM, IMAGE OUTPUT APPARATUS, COMMUNICATION PROCESSING METHOD THEREOF, AND COMPUTER-READABLE STORAGE MEDIUM

TECHNICAL FIELD

The present invention relates to a communication system, an image output apparatus, a communication processing method thereof, and a computer-readable storage medium.

BACKGROUND ART

A direct printing technique (e.g., PictBridge) of directly connecting a digital camera and a printer by a physical interface, and directly outputting an image captured by the digital camera from the printer without intervening a PC is known. At this moment, a USB (Universal Serial Bus) is the mainstream of the physical interface. Such direct printing technique, however, does not depend on the type of physical interface, and can also use a wireless interface in principle.

Depending on a protocol for a direct printing technique, a digital camera may not be able to release a connection until print processing by a printer is completed even if image data transfer is complete. If, for example, a connection between the digital camera and the printer is disconnected during the print processing, a print error occurs, and a paper sheet midway through the print processing is discharged.

To solve this problem, Japanese Patent Laid-Open No. 2004-129218 discloses a technique of causing a printer to transmit, to a digital camera, a command representing that the printer has received all image data. This makes it possible to detach the digital camera (the cable that connects the digital camera) from the printer without waiting for completion of printing.

The technique disclosed in Japanese Patent Laid-Open No. 2004-129218 described above allows detaching the digital camera from the printer without waiting for completion of printing on the printer side. However, the printer cannot execute print processing using the direct printing technique between it and the next digital camera until the print processing is completed. That is, although the connection port on the printer side is vacant, communication using that connection port cannot start before the completion of execution of the print processing.

This forces a user, who wants to start printing for the next digital camera, to wait until the print processing is completed to enable a connection on the printer side. In addition, the display device on the digital camera side displays, for example, "disconnected" at this time. For this reason, the user repeatedly performs connection processing.

DISCLOSURE OF INVENTION

The present invention provides a communication system, an image output apparatus, a communication processing method thereof, and a computer-readable storage medium, which increase user convenience by improving connection processing between an image supply apparatus and an image output apparatus during control of communication relating to an image.

According to the first aspect of the present invention there is provided a communication system including a plurality of image supply apparatuses and an image output apparatus, characterized in that each of the plurality of image supply apparatuses and the image output apparatus comprises: first communication control means for controlling communication using a first protocol; second communication control means for controlling communication relating to an image using a second protocol; and link control means for performing control associated with a connection of communication by the first communication control means and the second communication control means, and if communication with a first image supply apparatus using the first protocol is disconnected before completion of output processing of an image supplied from the first image supply apparatus under communication control by the second communication control means, and a second image supply apparatus requests a connection, the link control means of the image output apparatus establishes a connection of communication with the second image supply apparatus using the first protocol and holds a connection to the second image supply apparatus using the second protocol until the completion of the output processing of the image.

According to the second aspect of the present invention there is provided a communication system including a plurality of image supply apparatuses and an image output apparatus, characterized in that each of the plurality of image supply apparatuses and the image output apparatus comprises: first communication control means for controlling communication using a first protocol; second communication control means for controlling communication relating to an image using a second protocol; and link control means for performing control associated with a connection of communication by the first communication control means and the second communication control means, and if communication with a first image supply apparatus using the first protocol is disconnected before completion of output processing of an image supplied from the first image supply apparatus under communication control by the second communication control means, and a second image supply apparatus requests a connection, the link control means of the image output apparatus transmits, to the second image supply apparatus by communication using the first protocol, time information representing a wait time until the connection is permitted.

According to the third aspect of the present invention there is provided a communication apparatus characterized by comprising: first communication control means for controlling communication using a first protocol; second communication control means for controlling communication relating to an image using a second protocol; output means for performing output processing of an image transmitted from an image supply apparatus under communication control by the second communication control means; and link control means for performing control associated with a connection of communication by the first communication control means and the second communication control means, wherein if communication with a first image supply apparatus using the first protocol is disconnected before completion of the output processing, by the output means, of the image transmitted from the first image supply apparatus, and a second image supply apparatus requests a connection, the link control means establishes a connection of communication with the second image supply apparatus using the first protocol and holds a connection to the second image supply apparatus using the second protocol until the completion of the output processing of the image.

According to the fourth aspect of the present invention there is provided a communication apparatus characterized by comprising: first communication control means for controlling communication using a first protocol; second communication control means for controlling communication relating to an image using a second protocol; output means for performing output processing of an image transmitted from an image supply apparatus under communication control by the second communication control means; and link control means for performing control associated with a connection of communication by the first communication control means and the second communication control means, wherein if communication with a first image supply apparatus using the first protocol is disconnected before completion of the output processing, by the output means, of the image transmitted from the first image supply apparatus, and a second image supply apparatus requests a connection, the link control means transmits, to the second image supply apparatus by communication using the first protocol, time information representing a wait time until the connection is permitted.

According to the fifth aspect of the present invention there is provided a communication processing method for an image output apparatus, characterized by comprising: the first communication control step of controlling communication using a first protocol; the second communication control step of controlling communication relating to an image using a second protocol; and the link control step for performing control associated with a connection of communication in the first communication control step and the second communication control step, wherein in the link control step, if communication with a first image supply apparatus using the first protocol is disconnected before completion of output processing of an image supplied from the first image supply apparatus under communication control in the second communication control step, and a second image supply apparatus requests a connection, a connection of communication with the second image supply apparatus using the first protocol is established, and a connection to the second image supply apparatus using the second protocol is held until the completion of the output processing of the image.

According to the sixth aspect of the present invention there is provided a communication processing method for an image output apparatus, characterized by comprising: the first communication control step of controlling communication using a first protocol; the second communication control step of controlling communication relating to an image using a second protocol; and the link control step for performing control associated with a connection of communication in the first communication control step and the second communication control step, wherein in the link control step, if communication with a first image supply apparatus using the first protocol is disconnected before completion of output processing of an image supplied from the first image supply apparatus under communication control in the second communication control step, and a second image supply apparatus requests a connection, time information representing a wait time until the connection is permitted is transmitted to the second image supply apparatus by communication using the first protocol.

According to the seventh aspect of the present invention there is provided a computer-readable storage medium storing a computer program which causes a computer to function as: first communication control means for controlling communication using a first protocol; second communication control means for controlling communication relating to an image using a second protocol; and link control means for performing control associated with a connection of communication by the first communication control means and the second communication control means so as to, if communication with a first image supply apparatus using the first protocol is disconnected before completion of output processing of an image supplied from the first image supply apparatus under communication control by the second communication control means, and a second image supply apparatus requests a connection, establish a connection of communication with the second image supply apparatus using the first protocol and hold a connection to the second image supply apparatus using the second protocol until the completion of the output processing of the image.

According to the eighth aspect of the present invention there is provided a computer-readable storage medium storing a computer program which causes a computer to function as: first communication control means for controlling communication using a first protocol; second communication control means for controlling communication relating to an image using a second protocol; and link control means for performing control associated with a connection of communication by the first communication control means and the second communication control means so as to, if communication with a first image supply apparatus using the first protocol is disconnected before completion of output processing of an image supplied from the first image supply apparatus under communication control by the second communication control means, and a second image supply apparatus requests a connection, transmit, to the second image supply apparatus by communication using the first protocol, time information representing a wait time until the connection is permitted.

Further features of the present invention will be apparent from the following description of exemplary embodiments with reference to the attached drawings.

BRIEF DESCRIPTION OF DRAWINGS

FIG. 1 is a view showing an arrangement of a communication system according to an embodiment of the present invention;

FIGS. 8A and 8B are a sequence chart showing an example of the process sequence between a printer 10 and the digital camera 20 according to the second embodiment;

FIGS. 10A and 10B are a flowchart illustrating an example of the procedure of processing of the digital camera 20 according to the second embodiment.

BEST MODE FOR CARRYING OUT THE INVENTION

A preferred embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

FIG. 1 is a view showing an arrangement of a communication system according to an embodiment of the present invention.

The communication system according to this embodiment includes a first communication apparatus on the image supply side and a second communication apparatus on the image receiving side. An image supply apparatus 20 functions as the first communication apparatus and supplies an output target (print target) image to an image output apparatus 10. The image output apparatus 10 functions as the second communication apparatus and forms and outputs an image onto a printing medium such as a paper sheet based on the image received from the image supply apparatus 20. The image output apparatus 10 and the image supply apparatus 20 are connected using a communication unit (not shown). A direct print function is implemented between them using the communication unit. Note that in this embodiment, a description will be made assuming that the image output apparatus 10 is a printer, and the image supply apparatus 20 is a digital camera.

Figure 2:
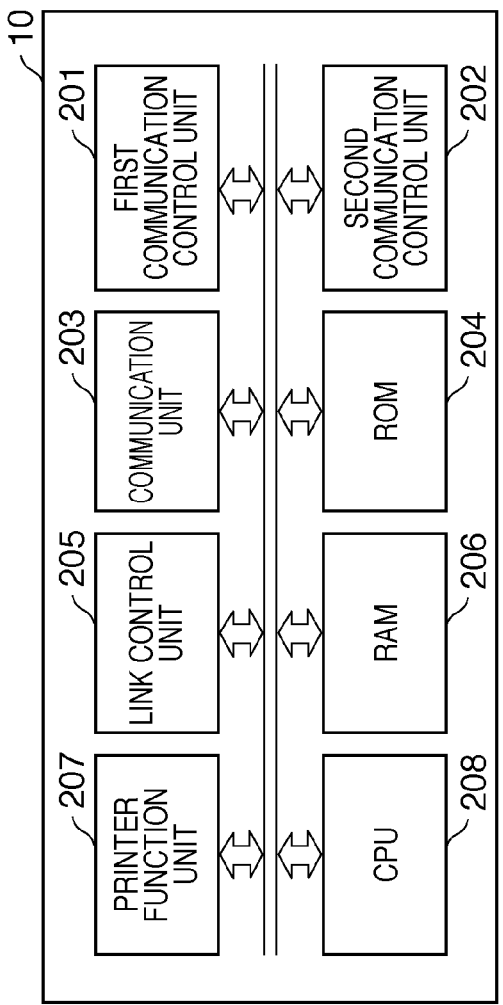
FIG. 2 is a block diagram showing an arrangement of a printer 10 shown in FIG. 1.

FIG. 2 is a block diagram showing an arrangement of the printer 10 shown in FIG. 1.

The printer 10 includes a first communication control unit 201, second communication control unit 202, communication unit 203, ROM 204, link control unit 205, RAM 206, printer function unit 207, and CPU 208.

The communication unit 203 serves as a communication interface. The first communication control unit 201 performs connection control of communication with a communication partner apparatus using a predetermined protocol (first protocol). For example, the first communication control unit 201 establishes a connection with the digital camera 20 via the communication unit 203.

The second communication control unit 202 controls communication relating to an image using a higher protocol (second protocol) of the protocol used for communication by the first communication control unit 201. For example, the unit 202 controls to receive an image transferred from the digital camera 20 side (to the self apparatus) and supply it to the printer function unit 207. The second communication control unit 202 controls the communication with the digital camera 20 using a communication path established by the communication unit 203 and first communication control unit 201.

The printer function unit 207 executes image output processing (to also be referred to as print processing hereinafter). That is, the unit 207 forms an image on a printing medium such as a paper sheet. The unit 207 executes print processing based on image data which has been received from the digital camera 20 under the communication control by the second communication control unit 202.

The link control unit 205 manages the communication control state in the first communication control unit 201 and in the second communication control unit 202 while managing the communication control by each of the control units. The link control unit 205 manages two states, that is, "disconnection" and "connection", as communication control states (connection states) of the first communication control unit 201. The link control unit 205 also manages five states, that is, "disconnection", "connection", "printing ","holding disconnection" and "holding connection", as communication control states (print processing states) of the second communication control unit 202.

The CPU 208 controls the printer 10 as a whole. The ROM 204 stores a processing procedure of the CPU 208. The RAM 206 is used as a work area for the CPU 208.

Figure 3:
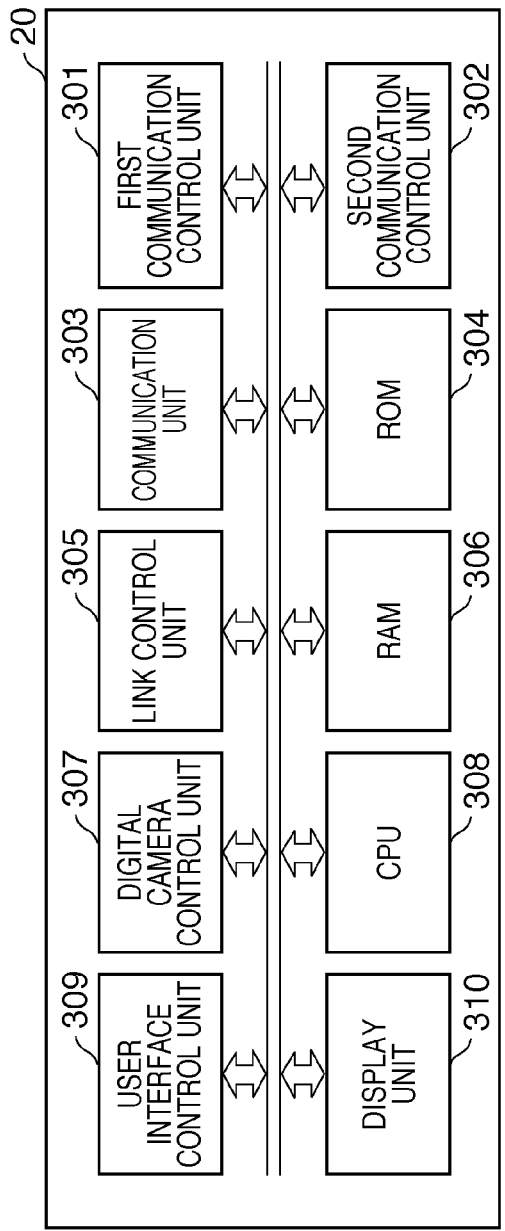
FIG. 3 is a block diagram showing an arrangement of a digital camera 20 shown in FIG. 1.

FIG. 3 is a block diagram showing an arrangement of the digital camera 20 shown in FIG. 1.

The digital camera 20 includes a first communication control unit 301, second communication control unit 302, communication unit 303, ROM 304, link control unit 305, RAM 306, digital camera control unit 307, CPU 308, user interface control unit 309, and display unit 310.

The communication unit 303 serves as a communication interface. The first communication control unit 301 establishes a connection with a communication partner apparatus using the predetermined protocol (first protocol). The first communication control unit 301, for example, establishes a connection with the printer 10 via the communication unit 303.

The second communication control unit 302 controls communication (e.g., image transfer) relating to an image using a protocol (second protocol) higher than the protocol used for communication by the first communication control unit 301. The second communication control unit 302 controls the communication using a communication path established by the communication unit 303 and first communication control unit 301.

The link control unit 305 manages the communication control state in the first communication control unit 301 and in the second communication control unit 302 while managing the communication control by each of the control units. The link control unit 305 manages two states, that is, "disconnection" and "connection", as communication control states (connection states) of the first communication control unit 301. The link control unit 305 also manages three states, that is, "disconnection", "connection" and "holding connection", as communication control states (connection states) of the second communication control unit 302.

The digital camera control unit 307 controls the digital camera 20. The user interface control unit 309 functions as an interface connecting the user and the digital camera 20. The user interface control unit 309 has an input function of inputting a print instruction which has been transmitted by the user using the direct print function, and an output function of outputting various pieces of information transmitted from the printer 10.

The display unit 310 displays various kinds of information under the control of the user interface control unit 309. The CPU 308 controls the digital camera 20 as a whole. The ROM 304 stores a processing procedure of the CPU 308. The RAM 306 is used as a work area for the CPU 308.

Figure 4A:
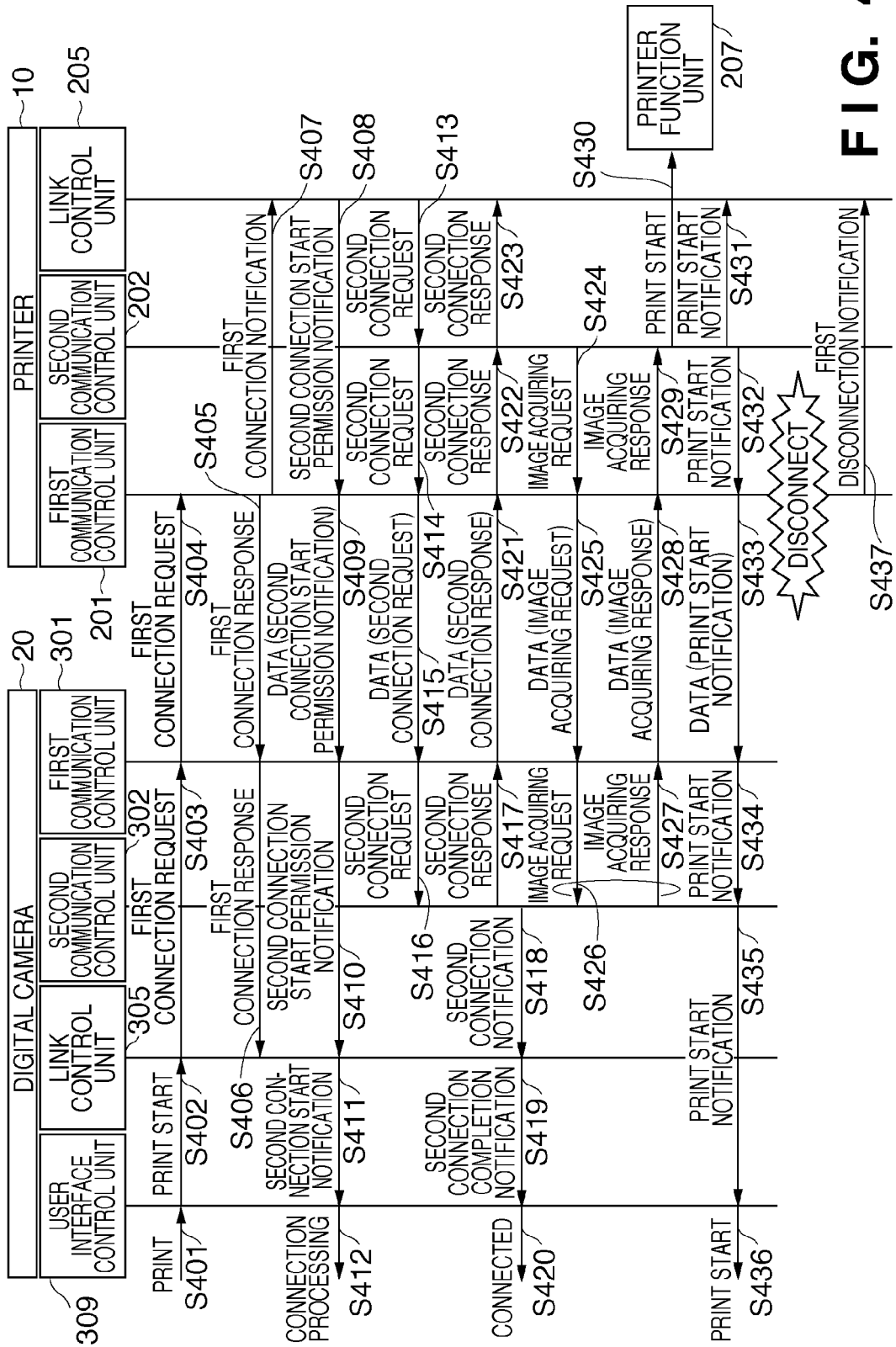
FIGS. 4A and 4B are a sequence chart showing an example of the process sequence between the printer 10 and the digital camera 20 shown in FIG. 1.
Figure 4B:
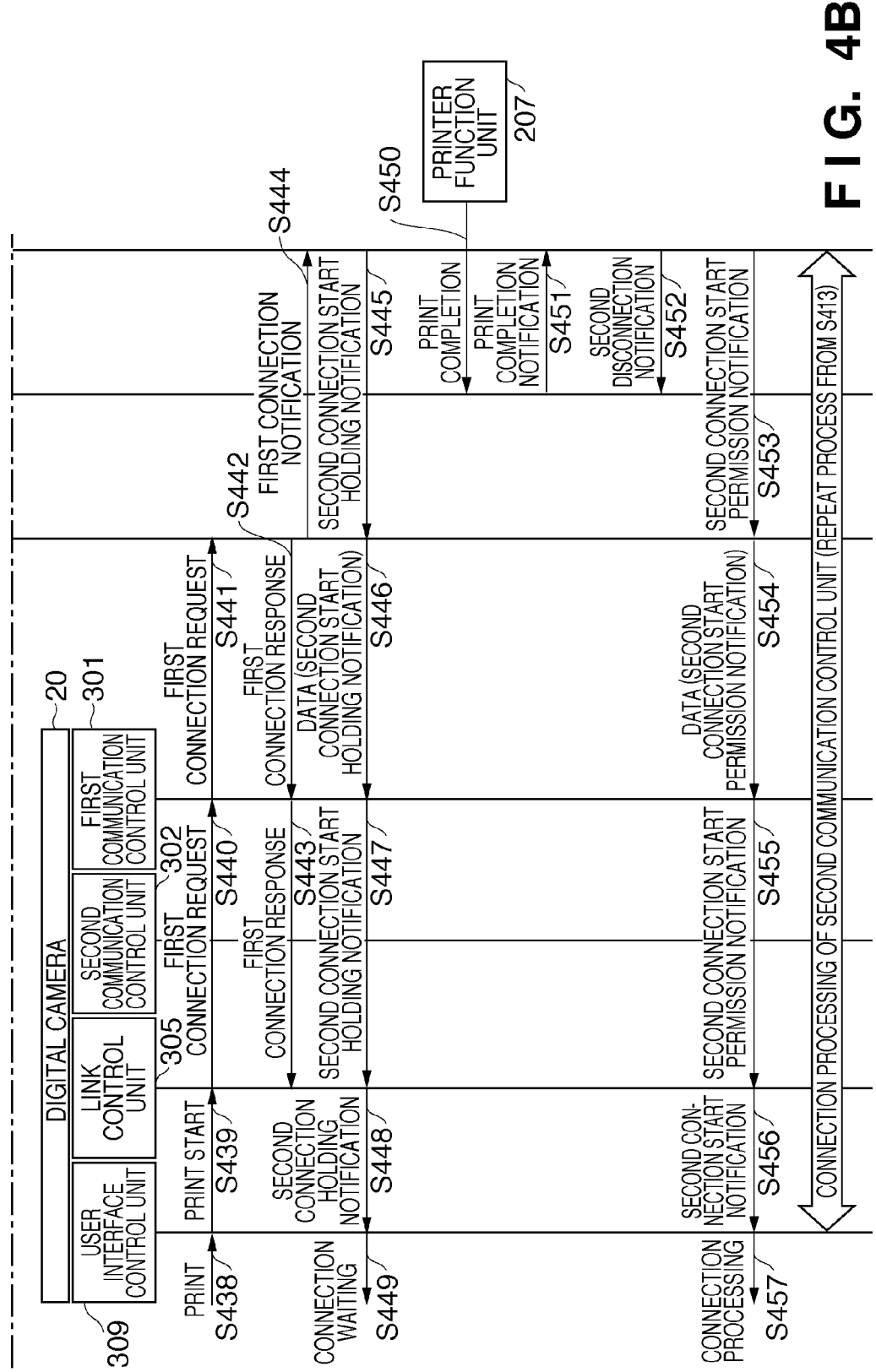

FIGS. 4A and 4B are a sequence chart showing an example of the process sequence between the printer 10 and the digital camera 20 shown in FIG. 1. An example will be explained here in which printing is performed using the direct print function between the printer 10 and the digital camera 20.

The link control unit 205 of the printer 10 is managing "disconnection" as the state of the first communication control unit 201 and "disconnection" as the state of the second communication control unit 202. The link control unit 305 of the digital camera 20 is managing "disconnection" as the state of the first communication control unit 301 and "disconnection" as the state of the second communication control unit 302. Assume that the user of the digital camera 20 operates it, and direct printing between the digital camera 20 and the printer 10 starts (S401).

The user interface control unit 309 of the digital camera 20 notifies the link control unit 305 of the start of printing based on the user operation (S402). The link control unit 305 transmits a first connection request to the first communication control unit 301 to request a connection to the first communication control unit 201 of the printer 10 (S403). The first communication control unit 301 receives the first connection request, transmits it to the printer 10, and waits for a first connection response from the printer 10 (S404).

The first communication control unit 201 of the printer 10 receives the first connection request and checks the communication control state of its own. The current state of the first communication control unit 201 is "disconnection". Hence, the first communication control unit 201 transits to the "connection" state and transmits the first connection response (connection permission) to the digital camera 20 (S405).

The first communication control unit 301 of the digital camera 20 receives the first connection response and transmits it to the link control unit 305 (S406). The link control unit 305 waits until a second notification associated with a connection start is received from the printer 10.

After transmitting the first connection response in step S405, the first communication control unit 201 of the printer 10 transmits a first connection notification to the link control unit 205 (S407). The link control unit 205 changes the state of the first communication control unit 201 to "connection" and then checks the communication control state of the second communication control unit 202. The current state of the second communication control unit 202 is "disconnection". Hence, the link control unit 205 transmits a second connection start permission notification representing a connection permission to the first communication control unit 201 (S408). The first communication control unit 201 of the printer 10 transmits the second connection start permission notification to the first communication control unit 301 of the digital camera 20 (S409).

The first communication control unit 301 of the digital camera 20 transmits the received second connection start permission notification to the link control unit 305 (S410). Upon receiving the notification, the link control unit 305 transmits a second connection start notification to the user interface control unit 309 (S411). Accordingly, the user interface control unit 309 displays "connection processing" on the display unit 310 (S412).

After transmitting the second connection start permission notification in step S408, the link control unit 205 of the printer 10 transmits a second connection request to the second communication control unit 202 (S413). The second communication control unit 202 transmits the second connection request to the first communication control unit 201 (S414). The first communication control unit 201 transmits the second connection request to the digital camera 20 (S415).

The first communication control unit 301 of the digital camera 20 receives the second connection request and transmits it to the second communication control unit 302 (S416). The second communication control unit 302 transits to the "connection" state and transmits a second connection response to the first communication control unit 301 (S417). At this time, the second communication control unit 302 transmits a second connection notification to the link control unit 305 (S418). Upon receiving the second connection notification, the link control unit 305 changes the state of the second communication control unit 302 to "connection" and transmits a second connection completion notification to the user interface control unit 309 (S419). Accordingly, the user interface control unit 309 displays "connected" on the display unit 310 (S420).

After receiving the second connection response in step S417, the first communication control unit 301 of the digital camera 20 transmits it to the printer 10 (S421). The first communication control unit 201 of the printer 10 receives the second connection response and transmits it to the second communication control unit 202 (S422). The second communication control unit 202 transits to the "connection" state and transmits the second connection response to the link control unit 205 (S423). The link control unit 205 changes the state of the second communication control unit 202 to "connection". The connection by the second communication control units 202 and 302 is thus completed between the printer 10 and the digital camera 20.

After receiving the second connection response in step S422, the second communication control unit 202 of the printer 10 transmits an image acquiring request to the first communication control unit 201 to acquire print target image data (S424). The first communication control unit 201 transmits the image acquiring request to the digital camera 20 (S425).

The first communication control unit 301 of the digital camera 20 receives the image acquiring request and transmits it to the second communication control unit 302 (S426). The second communication control unit 302 transmits the print target image data to the first communication control unit 301 as an image acquiring response (S427). The first communication control unit 301 transmits the image acquiring response to the first communication control unit 201 (S428).

The first communication control unit 201 of the printer 10 receives the response and transmits the received image data to the second communication control unit 202 (S429). The second communication control units 202 and 302 repeatedly execute the process in steps S424 to S429 until transmission and reception of all print target image data are completed.

Having received all the print target image data, the second communication control unit 202 of the printer 10 transits to the "printing" state and instructs the printer function unit 207 to perform printing based on the received image data (S430). Upon receiving the instruction, the printer function unit 207 executes print processing based on the instruction. At this time, the second communication control unit 202 transmits a print start notification to the link control unit 205 (S431). The link control unit 205 receives the notification and changes the state of the second communication control unit 202 to "printing". The second communication control unit 202 transmits the print start notification to the first communication control unit 201 as well (S432). The first communication control unit 201 receives the print start notification and transmits it to the digital camera 20 (S433).

The first communication control unit 301 of the digital camera 20 receives the print start notification and transmits it to the second communication control unit 302 (S434). The second communication control unit 302 transmits the print start notification to the user interface control unit 309 (S435). The user interface control unit 309 displays "print start" on the display unit 310 (S436).

Assume that the user sees the display of print start and detaches the digital camera 20 from the printer 10 so that the first communication control units 201 and 301 are disconnected from each other. Upon detecting the disconnection, the first communication control unit 201 of the printer 10 transmits a first disconnection notification representing the disconnection to the link control unit 205 (S437). Upon receiving the notification, the link control unit 205 changes the state of the first communication control unit 201 to "disconnection" and checks the communication control state of the second communication control unit 202. The current state of the second communication control unit 202 is "printing". Hence, the link control unit 205 changes the state of the second communication control unit 202 from "printing" to "holding disconnection". At this time, the printer function unit 207 of the printer 10 continues the print processing.

Assume that the user operates the digital camera 20 to instruct printing by direct printing again (S438). At this time, the link control unit 205 of the printer 10 is managing "disconnection" as the state of the first communication control unit 201 and "holding disconnection" as the state of the second communication control unit 202. The link control unit 305 of the digital camera 20 is managing "disconnection" as the state of the first communication control unit 301 and "disconnection" as the state of the second communication control unit 302.

The user interface control unit 309 of the digital camera 20 notifies the link control unit 305 of the start of printing based on the user operation (S439). The link control unit 305 transmits a first connection request to the first communication control unit 301 to request a connection to the first communication control unit 201 of the printer 10 (S440). The first communication control unit 301 receives the first connection request, transmits it to the printer 10, and waits for a first connection response from the printer 10 (S441).

The first communication control unit 201 of the printer 10 receives the first connection request and checks the communication control state of its own. The current state of the first communication control unit 201 is "disconnection". Hence, the first communication control unit 201 transits to the "connection" state and transmits the first connection response (connection permission) to the digital camera 20 (S442).

The first communication control unit 301 of the digital camera 20 receives the first connection response and transmits it to the link control unit 305 (S443). The link control unit 305 waits until a second notification associated with a connection start is received from the printer 10.

The first communication control unit 201 of the printer 10 which has transmitted the first connection response in step S442, transmits a first connection notification to the link control unit 205 (S444). The link control unit 205 changes the state of the first communication control unit 201 to "connection" and then checks the communication control state of the second communication control unit 202. The current state of the second communication control unit 202 is "holding disconnection". Hence, the link control unit 205 changes the state of the second communication control unit 202 from "holding disconnection" to "holding connection". The link control unit 205 transmits a second connection start holding notification representing connection holding to the first communication control unit 201 (S445). The first communication control unit 201 of the printer 10 transmits the second connection start holding notification to the first communication control unit 301 of the digital camera 20 (S446).

The first communication control unit 301 of the digital camera 20 transmits the received second connection start holding notification to the link control unit 305 (S447). Upon receiving the notification, the link control unit 305 transmits the second connection holding notification to the user interface control unit 309 (S448). Accordingly, the user interface control unit 309 displays "connection waiting" on the display unit 310 (S449).

Assume that the printer 10 has completed the print processing requested in step S430. The printer function unit 207 notifies the second communication control unit 202 of the completion of printing (S450). Upon receiving the notification, the second communication control unit 202 transmits a print completion notification to the link control unit 205 (S451). The link control unit 205 checks the communication control state of the second communication control unit 202. The current state of the second communication control unit 202 is "holding connection". Hence, the link control unit 205 transmits a second disconnection notification to the second communication control unit 202, thereby temporarily setting the second communication control unit 202 in the "disconnection" state (S452).

The link control unit 205 also transmits a second connection start permission notification representing a connection permission to the first communication control unit 201 (S453). The first communication control unit 201 of the printer 10 transmits the second connection start permission notification to the first communication control unit 301 of the digital camera 20 (S454).

The first communication control unit 301 of the digital camera 20 transmits the received second connection start permission notification to the link control unit 305 (S455). Upon receiving the notification, the link control unit 305 transmits a second connection start notification to the user interface control unit 309 (S456). Accordingly, the user interface control unit 309 displays "connection processing" on the display unit 310 (S457).

After that, the digital camera 20 and the printer 10 execute transmission and reception of print target image data, print processing based on the image data, and the like. These processes are performed by repeatedly executing the process from step S413 described above, and a description thereof will not be repeated.

Figure 5:
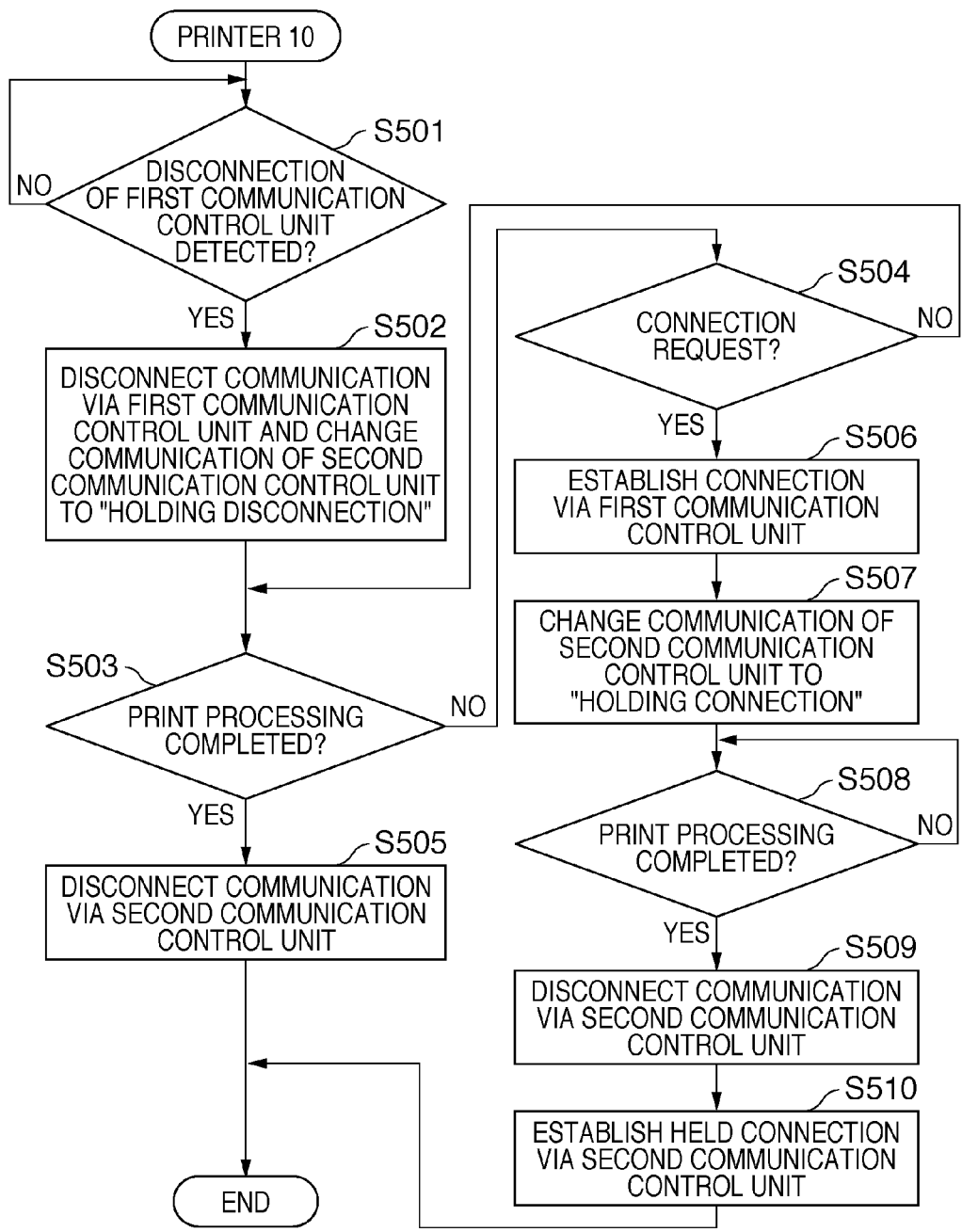
FIG. 5 is a flowchart illustrating an example of the procedure of processing of the printer 10 shown in FIG. 1.

The outline of the procedure of processing in each of the printer 10 and the digital camera 20 shown in FIG. 1 will briefly be described next. FIG. 5 is a flowchart illustrating an example of the procedure of processing of the printer 10. A case will be explained here in which a connection via the first communication control unit 201 is disconnected during print processing by direct printing (i.e., the process from step S437 in FIG. 4A).

The first communication control unit 201 of the printer 10 detects a disconnection (YES in step S501). Upon detecting the disconnection, the link control unit 205 of the printer 10 changes the state of the first communication control unit 201 to "disconnection" and the state of the second communication control unit 202 from "printing" to "holding disconnection" (S502). At this time, the printer function unit 207 of the printer 10 continues the print processing.

The printer 10 waits until the printer function unit 207 ends the print processing, or a connection request is received from the digital camera 20 (or another communication apparatus) (NO in step S503 and then NO in step S504). When the print processing is completed (YES in S503), the printer 10 disconnects the communication via the second communication control unit 202 (S505), and ends the processing.

When a connection request is received in steps S503 and S504 (YES in step S504), the printer 10 establishes a connection to the digital camera 20 via the first communication control unit 201 (S506). Since the print processing of the printer function unit 207 has not ended yet, the printer 10 holds a connection via the second communication control unit 202 (S507) and waits until the print processing is completed (NO in step S508). More specifically, the link control unit 205 changes the state of the second communication control unit 202 from "holding disconnection" to "holding connection" and waits for the completion of the print processing.

When the print processing is completed (YES in step S508), the printer 10 disconnects the communication via the second communication control unit 202 (S509). The printer 10 establishes the held connection via the second communication control unit 202 (S510) and ends the processing.

Figure 6A:
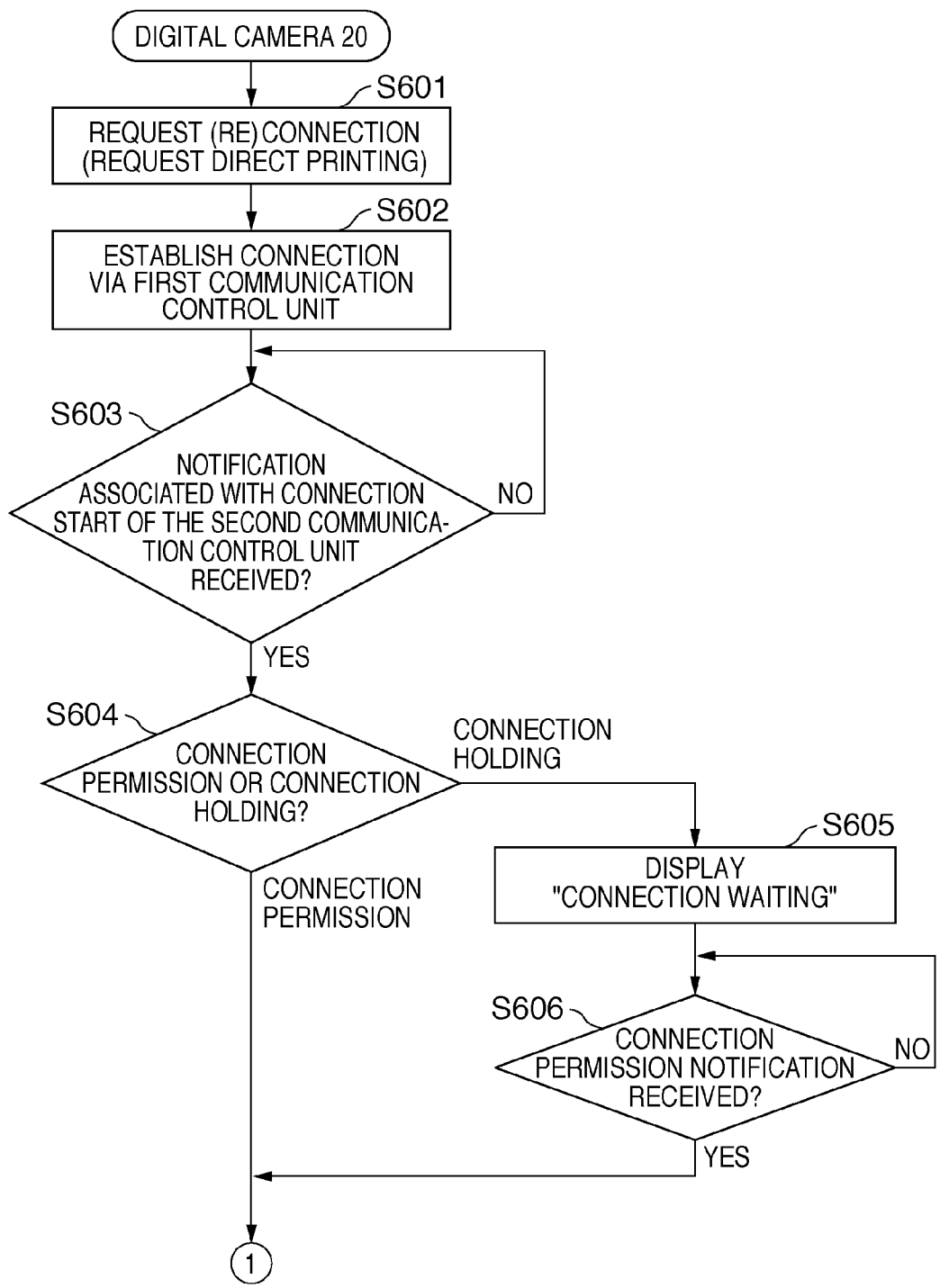
FIGS. 6A and 6B are a flowchart illustrating an example of the procedure of processing of the digital camera 20 shown in FIG. 1.
Figure 6B:
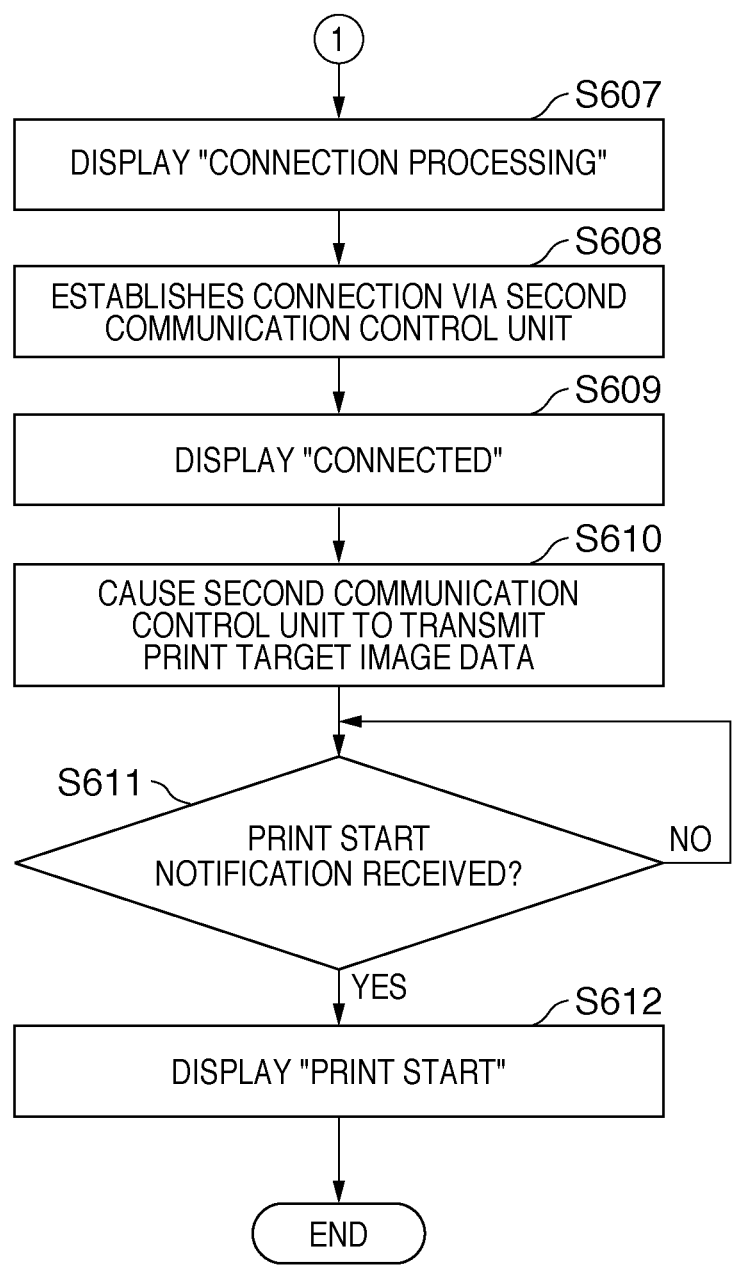

FIGS. 6A and 6B are a flowchart illustrating an example of the procedure of processing of the digital camera 20. Processing when requesting printing by direct printing will be explained here (i.e., the process from step S401 in FIG. 4A or S438 in FIG. 4B).

The first communication control unit 301 of the digital camera 20 transmits a connection request (for requesting direct printing) to the printer 10 (S601). Upon receiving a response (connection permission) from the printer 10, the digital camera 20 establishes a connection to the printer 10 via the first communication control unit 301 (S602).

After establishment of the connection, the digital camera 20 waits until a notification associated with the connection start of the second communication control unit 302 is received from the printer 10 (NO in step S603). Upon receiving a connection holding notification (YES in step S603 and then connection holding in step S604), the digital camera 20 displays "connection waiting" on the display unit 310 (S605). The digital camera 20 waits until a connection permission notification from the printer 10 (NO in step S606).

Upon receiving a connection permission notification in step S603 or S606 (connection permission in step S604 or YES in step S606), the digital camera 20 displays "connection processing" on the display unit 310 (S607). After that, the digital camera 20 establishes a connection to the printer 10 via the second communication control unit 302 (S608). At this time, the digital camera 20 displays "connected" on the display unit 310 (S609).

Subsequently, the second communication control unit 302 of the digital camera 20 transmits print target image data to the printer 10 (S610). Upon receiving a print start notification from the printer 10 (YES in step S611), the digital camera 20 displays "print start" on the display unit 310 (S612). Direct printing between the digital camera 20 and the printer 10 is implemented in this way.

As described above, according to the first embodiment, even when the printer 10 side is performing print processing by direct printing, connection processing between the digital camera 20 and the digital camera 20 is executed if a vacant connection port exists. In addition, direct printing can be executed at the same time as the completion of the print processing on the printer 10 side. The display unit 310 of the digital camera 20 displays "connection processing" during print processing and "print start" simultaneously with the start of direct printing. This allows the user to start a connection between the apparatuses without waiting for the print processing on the printer 10 side. Additionally, the convenience improves because the user can easily grasp the processing state between the apparatuses.

(Second Embodiment)

The second embodiment will be described next. In the second embodiment, a case will be explained in which if print processing is progressing when the digital camera 20 side has issued a direct print request, the time until the completion of the print processing and the start of printing by direct printing is displayed. Note that the overall arrangement and the printer arrangement according to the second embodiment are the same as in FIGS. 1 and 2 described in the first embodiment, and a description thereof will not be repeated.

Figure 7:
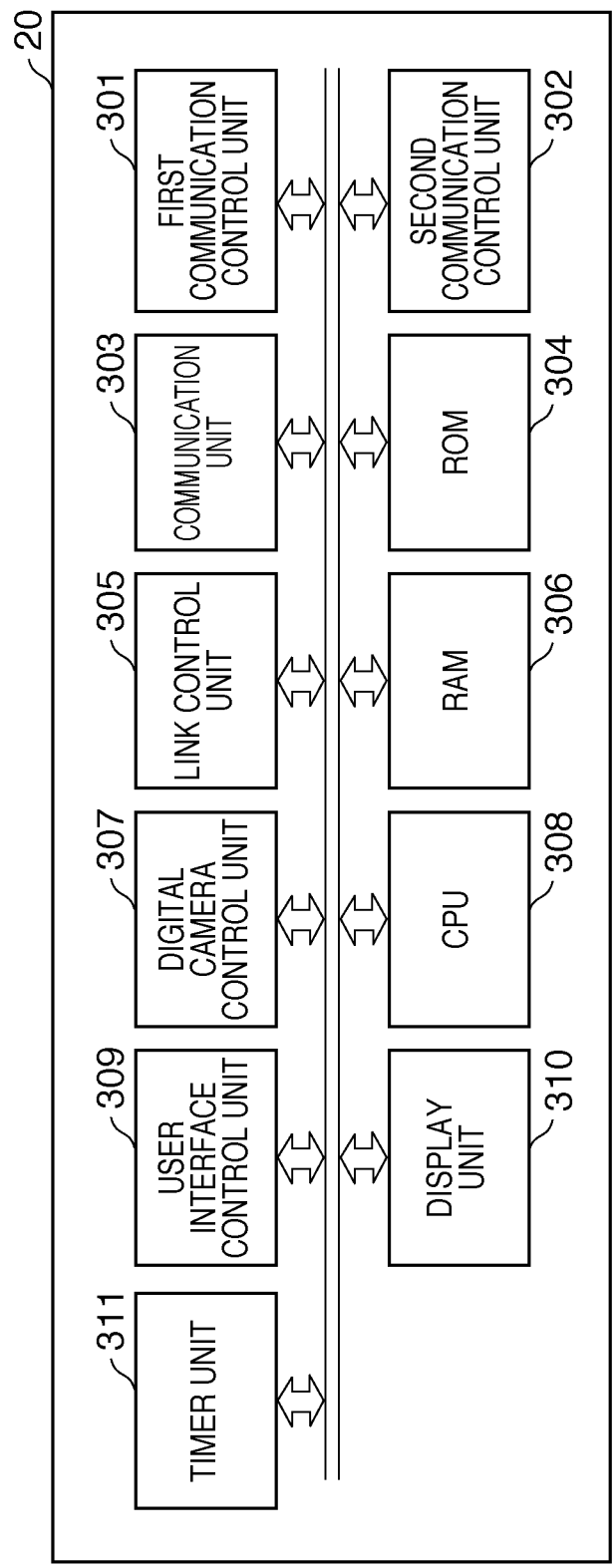
FIG. 7 is a block diagram showing an arrangement of a digital camera 20 according to the second embodiment.

FIG. 7 is a block diagram showing an arrangement of a digital camera 20 according to the second embodiment. Note that the same reference numerals as in FIG. 3 described in the first embodiment denote blocks having the same functions in FIG. 7, and a description thereof will not be repeated.

The digital camera 20 includes a timer unit 311 in addition to the arrangement of the first embodiment. The function of the timer unit 311 will be explained later.

Figure 8A:
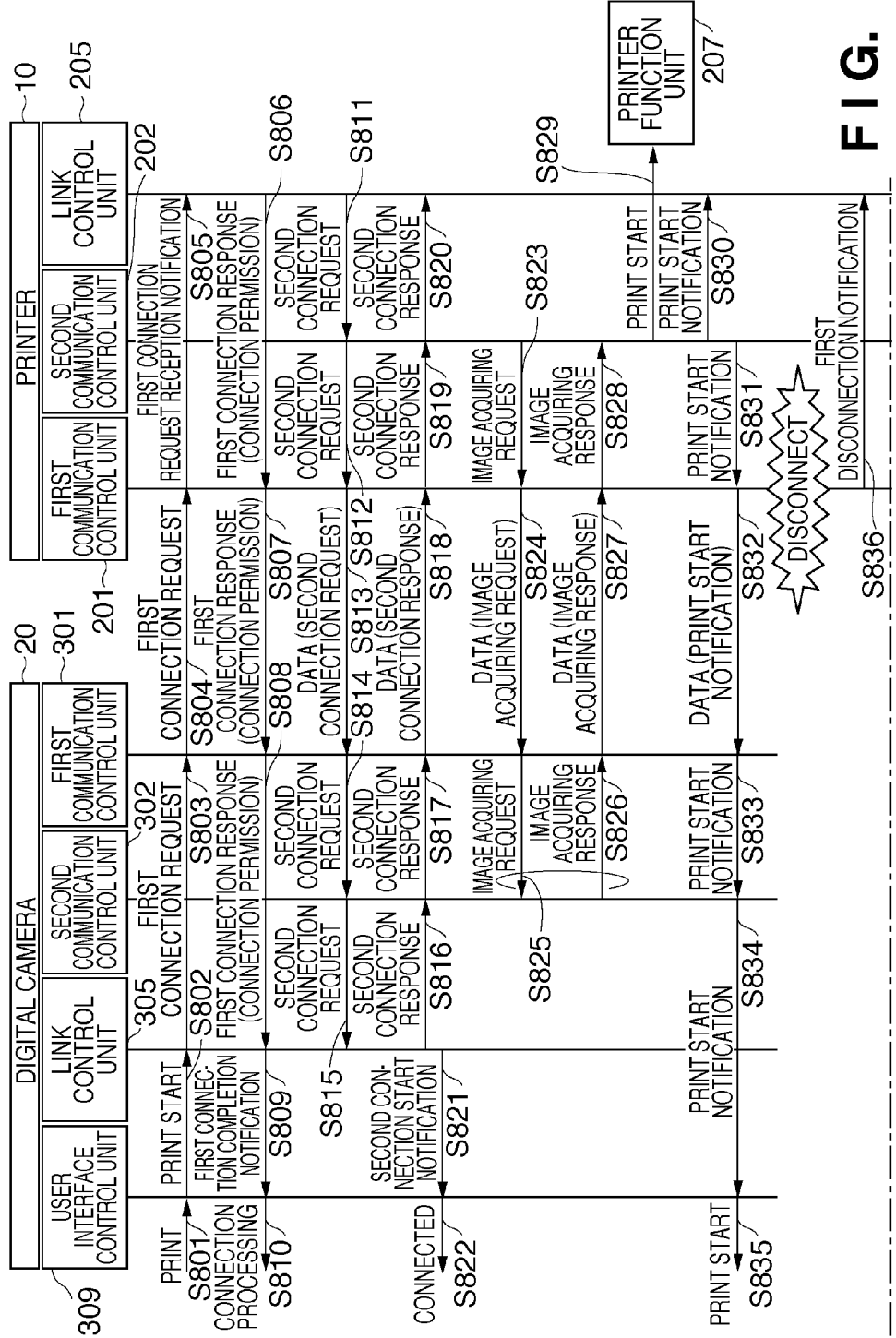

FIGS. 8A and 8B are a sequence chart showing an example of the process sequence between a printer 10 and the digital camera 20 according to the second embodiment. An example will be explained here in which printing is performed using the direct print function between the printer 10 and the digital camera 20. Note that a first connection response according to the second embodiment includes a connection permission/prohibition portion representing a connection permission/prohibition and an additional information portion representing the reason for the connection permission/prohibition.

A link control unit 205 of the printer 10 is managing "disconnection" as the state of a first communication control unit 201 and "disconnection" as the state of a second communication control unit 202. A link control unit 305 of the digital camera 20 is managing "disconnection" as the state of a first communication control unit 301 and "disconnection" as a state of a second communication control unit 302. Assume that the user of the digital camera 20 operates it, and direct printing between the digital camera 20 and the printer 10 starts (S801).

A user interface control unit 309 of the digital camera 20 notifies the link control unit 305 of the start of printing based on the user operation (S802). The link control unit 305 transmits a first connection request to the first communication control unit 301 to request a connection to the first communication control unit 201 of the printer 10 (S803). The first communication control unit 301 receives the first connection request, transmits it to the printer 10, and waits for a first connection response from the printer 10 (S804).

The first communication control unit 201 of the printer 10 receives the first connection request and transmits a first connection request reception notification to the link control unit 205 (S805). The link control unit 205 checks the communication control states of the first communication control unit 201 and the second communication control unit 202. The state of the first communication control unit 201 is "disconnection", and the state of the second communication control unit 202 is "disconnection", too. Hence, the link control unit 205 changes the state of the first communication control unit 201 to "connection" and transmits, to the first communication control unit 201, the first connection response whose connection permission/prohibition portion sets a connection permission (S806). Upon receiving the response, the first communication control unit 201 transits to the "connection" state and transmits the first connection response to the digital camera 20 (S807).

The first communication control unit 301 of the digital camera 20 receives the first connection response and transmits it to the link control unit 305 (S808). The link control unit 305 checks the connection permission/prohibition portion of the first connection response. The connection permission/prohibition portion sets a connection permission. Hence, the link control unit 305 changes the state of the first communication control unit 301 to "connection" and transmits a first connection completion notification to the user interface control unit 309 (S809). Upon receiving the notification, the user interface control unit 309 displays "connection processing" on a display unit 310 (S810).

The link control unit 205 of the printer 10 which has transmitted the first connection response in step S806 transmits a second connection request to the second communication control unit 202 (S811). The second communication control unit 202 receives the second connection request and transmits it to the first communication control unit 201 (S812). The first communication control unit 201 transmits the second connection request to the digital camera 20 (S813).

The first communication control unit 301 of the digital camera 20 receives the second connection request and transmits it to the second communication control unit 302 (S814).

The second communication control unit 302 receives the second connection request and transmits it to the link control unit 305 (S815). The link control unit 305 checks the communication control state of the second communication control unit 302. The current state of the second communication control unit 302 is "disconnection". The link control unit 305 changes the state of the second communication control unit 302 from "disconnection" to "connection" and transmits a second connection response to the second communication control unit 302 (S816). At this time, the link control unit 305 transmits a second connection start notification to the user interface control unit 309 (S821). Upon receiving the notification, the user interface control unit 309 displays "connected" on the display unit 310 (S822).

Upon receiving the second connection response, the second communication control unit 302 transits to the "connection" state and transmits the second connection response to the first communication control unit 301 (S817). The first communication control unit 301 transmits the Second connection response to the printer 10 (S818).

The first communication control unit 201 of the printer 10 receives the second connection response and transmits it to the second communication control unit 202 (S819). Upon receiving the response, the second communication control unit 202 transits to the "connection" state and transmits the second connection response to the link control unit 205 (S820). The link control unit 205 changes the state of the second communication control unit 202 to "connection". The connection by the second communication control units 202 and 302 is thus completed between the printer 10 and the digital camera 20.

After receiving the second connection response in step S819, the second communication control unit 202 of the printer 10 transmits an image acquiring request to the first communication control unit 201 to acquire print target image data (S823). The first communication control unit 201 transmits the image acquiring request to the digital camera 20 (S824).

The first communication control unit 301 of the digital camera 20 receives the image acquiring request and transmits it to the second communication control unit 302 (S825). The second communication control unit 302 transmits the print target image data to the first communication control unit 301 as an image acquiring response (S826). The first communication control unit 301 transmits the image acquiring response to the first communication control unit 201 (S827).

The first communication control unit 201 of the printer 10 receives the response and transmits the received image data to the second communication control unit 202 (S828). The second communication control units 202 and 302 repeatedly execute the process in steps S823 to S828 until transmission and reception of all print target image data are completed.

Having received all the print target image data, the second communication control unit 202 of the printer 10 transits to the "printing" state and instructs a printer function unit 207 to perform printing based on the received image data (S829). Upon receiving the instruction, the printer function unit 207 executes print processing based on the instruction. At this time, the second communication control unit 202 transmits a print start notification to the link control unit 205 (S830). The link control unit 205 receives the notification and changes the state of the second communication control unit 202 to "printing". The second communication control unit 202 transmits the print start notification to the first communication control unit 201 as well (S831). The first communication control unit 201 receives the print start notification and transmits it to the digital camera 20 (S832).

The first communication control unit 301 of the digital camera 20 receives the print start notification and transmits it to the second communication control unit 302 (S833). The second communication control unit 302 transmits the print start notification to the user interface control unit 309 (S834). The user interface control unit 309 displays "print start" on the display unit 310 (S835).

Assume that the user sees the display of print start and detaches the digital camera 20 from the printer 10 so that the first communication control units 201 and 301 are disconnected from each other. Upon detecting the disconnection, the first communication control unit 201 of the printer 10 transmits a first disconnection notification representing the disconnection to the link control unit 205 (S836). Upon receiving the notification, the link control unit 205 changes the state of the first communication control unit 201 to "disconnection" and checks the communication control state of the second communication control unit 202. The current state of the second communication control unit 202 is "printing". Hence, the link control unit 205 changes the state of the second communication control unit 202 from "printing" to "holding disconnection". At this time, the printer function unit 207 of the printer 10 continues the print processing.

Assume that the user operates the digital camera 20 to instruct printing by direct printing again (S837). At this time, the link control unit 205 of the printer 10 is managing "disconnection" as the state of the first communication control unit 201 and "holding disconnection" as the state of the second communication control unit 202. The link control unit 305 of the digital camera 20 is managing "disconnection" as the state of the first communication control unit 301 and "disconnection" as the state of the second communication control unit 302.

The user interface control unit 309 of the digital camera 20 notifies the link control unit 305 of the start of printing based on the user operation (S838). The link control unit 305 transmits a first connection request to the first communication control unit 301 to request a connection to the first communication control unit 201 of the printer 10 (S839). The first communication control unit 301 receives the first connection request, transmits it to the printer 10, and waits for a first connection response from the printer 10 (S840).

The first communication control unit 201 of the printer 10 receives the first connection request and transmits it to the link control unit 205 (S841). Upon receiving the request, the link control unit 205 checks the states of the first communication control unit 201 and the second communication control unit 202. The current state of the first communication control unit 201 is "disconnection", and the state of the second communication control unit 202 is "holding disconnection". Hence, the link control unit 205 sets a connection prohibition in the connection permission/prohibition portion of the first connection response and also sets, in the additional information portion, time information representing the wait time until reception of the next connection. The link control unit 205 transmits the first connection response to the first communication control unit 201 (S842). The first communication control unit 201 receives the first connection response and transmits it to the digital camera 20 (S843).

The first communication control unit 301 of the digital camera 20 receives the first connection response and transmits it to the link control unit 305 (S844). The link control unit 305 checks the connection permission/prohibition portion of the first connection response. The connection permission/prohibition portion sets a connection prohibition. The link control unit 305 also checks the additional information portion. The additional information portion sets the wait time until the printer 10 receives the next connection. The link control unit 305 acquires the wait time and transmits a first connection holding notification to the user interface control unit 309 (S845). Upon receiving the notification, the user interface control unit 309 displays "connection waiting" on the display unit 310 (S846). At this time, the link control unit 305 may transmit the wait time until reception of the next connection to the user interface control unit 309 and display, on the display unit 310, the wait time until the connection as well as "connection waiting".

Assume that the printer 10 has completed the print processing requested in step S829. The printer function unit 207 notifies the second communication control unit 202 of the completion of printing (S848). Upon receiving the notification, the second communication control unit 202 transmits a print completion notification to the link control unit 205 (S849). The link control unit 205 checks the communication control state of the second communication control unit 202. The current state of the second communication control unit 202 is "holding disconnection". Hence, the link control unit 205 transmits a second disconnection notification to the second communication control unit 202, thereby temporarily setting the second communication control unit 202 in the "disconnection" state (S850).

Upon receiving the first connection response representing the connection prohibition in step S844, the link control unit 305 transmits the wait time acquired from the response to the timer unit 311. The timer unit 311 counts the time until the wait time to the connection has elapsed (S847). When the wait time to the connection has elapsed, the link control unit 305 is notified of it and transmits a first connection request to the first communication control unit 301 (S851). The first communication control unit 301 transmits the first connection request to the printer 10 and waits for a response (first connection response) for it (S852).

The first communication control unit 201 of the printer 10 receives the first connection request and transmits it to the link control unit 205 (S853). The link control unit 205 checks the states of the first communication control unit 201 and the second communication control unit 202. The state of the first communication control unit 201 is "disconnection", and the state of the second communication control unit 202 is "disconnection", too. Hence, the link control unit 205 changes the state of the first communication control unit 201 to "connection" and transmits, to the first communication control unit 201, the first connection response whose connection permission/prohibition portion sets a connection permission (S854). Upon receiving the response, the first communication control unit 201 transits to the "connection" state and transmits the first connection response to the digital camera 20 (S855).

The first communication control unit 301 of the digital camera 20 receives the first connection response and transmits it to the link control unit 305 (S856). The link control unit 305 checks the connection permission/prohibition portion of the first connection response. The connection permission/prohibition portion sets a connection permission. Hence, the link control unit 305 changes the state of the first communication control unit 301 to "connection" and transmits a first connection completion notification to the user interface control unit 309 (S857). Upon receiving the notification, the user interface control unit 309 displays "connection processing" on the display unit 310 (S858).

After that, the digital camera 20 and the printer 10 execute establishment of a connection via the second communication control units 202 and 302, transmission and reception of print target image data, print processing based on the image data, and the like. These processes are performed by repeatedly executing the process from step S811 described above, and a description thereof will not be repeated.

Figure 9:
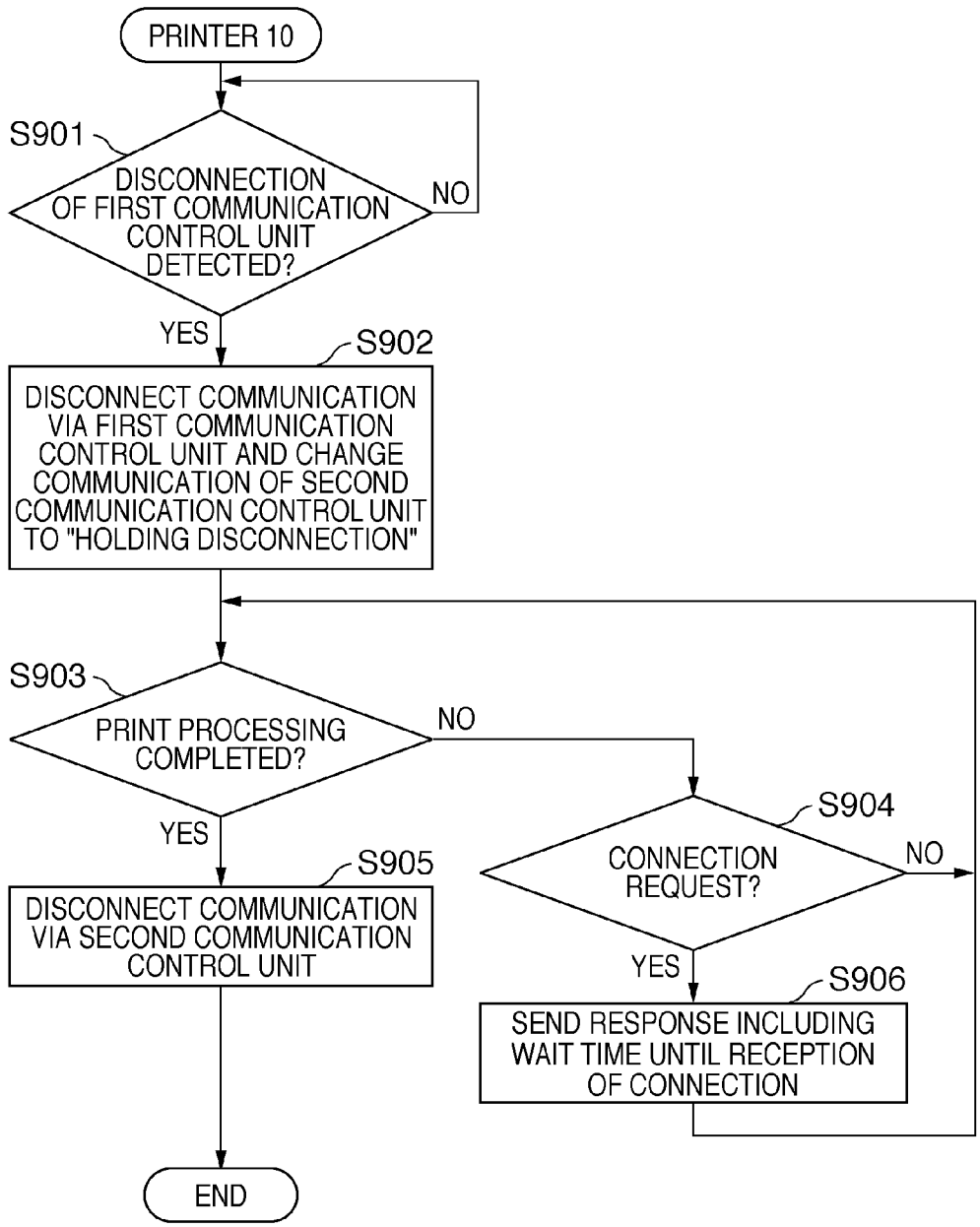
FIG. 9 is a flowchart illustrating an example of the procedure of processing of the printer 10 according to the second embodiment.

The outline of the procedure of processing in each of the printer 10 and the digital camera 20 according to the second embodiment will briefly be described next. FIG. 9 is a flowchart illustrating an example of the procedure of processing of the printer 10. A case will be explained here in which a connection via the first communication control unit 201 is disconnected during print processing by direct printing (i.e., the process from step S836 in FIG. 8A).

The first communication control unit 201 of the printer 10 detects a disconnection (YES in step S901). Upon detecting the disconnection, the link control unit 205 of the printer 10 changes the state of the first communication control unit 201 to "disconnection" and the state of the second communication control unit 202 from "printing" to "holding disconnection" (S902). At this time, the printer function unit 207 of the printer 10 continues the print processing.

The printer 10 waits until the printer function unit 207 ends the print processing, or a connection request is received from the digital camera 20 (or another communication apparatus) (NO in step S903 and then NO in step S904). When the print processing is completed (YES in S903), the printer 10 disconnects the communication via the second communication control unit 202 (S905), and ends the processing.

When a connection request is received (YES in step S904), the first communication control unit 201 of the printer 10 transmits a response including the wait time until a connection to the connection request source (S906) while the printer function unit 207 continues the print processing. More specifically, since the print processing of the printer function unit 207 is not completed yet, a connection response in which the connection permission/prohibition portion (connection prohibition) and the additional information portion (wait time) are set is returned. After that, the process returns to step S903. The printer 10 determines whether the print processing of the printer function unit 207 is complete. If the print processing is complete, the communication via the second communication control unit 202 is disconnected (S905). Then, connection processing is performed for the digital camera 20 which has transmitted a connection request to the first communication control unit 201 for the first time.

Figure 10B:
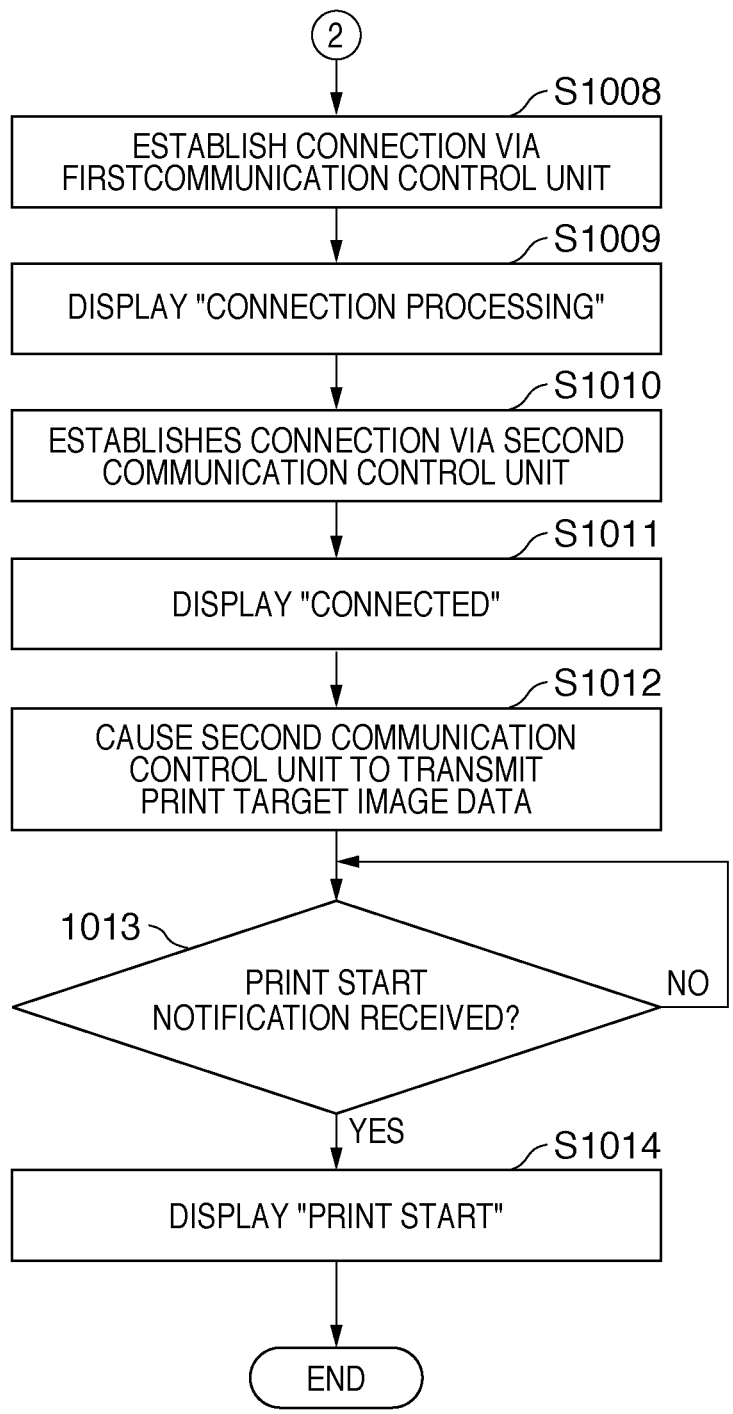

FIGS. 10A and 10B are a flowchart illustrating an example of the procedure of processing of the digital camera 20. Processing when requesting printing by direct printing will be explained here (i.e., the process from step S801 in FIG. 8A or S837 in FIG. 8B).

The first communication control unit 301 of the digital camera 20 transmits a connection request (for requesting direct printing) to the printer 10 (S1001) and waits for a response (NO in step S1002).

Upon receiving a connection prohibition notification (YES in step S1002 and then connection prohibition in step S1003), the digital camera 20 acquires the wait time from the received response (S1004). The timer unit 311 of the digital camera 20 starts counting the connection wait time (S1005) and displays "connection waiting" and the connection wait time on the display unit 310 (S1006).

When the wait time has elapsed (YES in step S1007), or a connection permission notification is received in step S1003 (connection permission in step S1003), the digital camera 20 advances to step S1008. More specifically, the first communication control unit 301 of the digital camera 20 establishes a connection to the printer 10 (S1008). At this time, the digital camera 20 displays "connection processing" on the display unit 310 (S1009). After that, the digital camera 20 establishes a connection to the printer 10 via the second communication control unit 302 (S1010). At this time, the digital camera 20 displays "connected" on the display unit 310 (S1011).

Subsequently, the second communication control unit 302 of the digital camera 20 transmits print target image data to the printer 10 (S1012). Upon receiving a print start notification from the printer 10 (YES in step S1013), the digital camera 20 displays "print start" on the display unit 310 (S1014). Direct printing between the digital camera 20 and the printer 10 is implemented in this way.

As described above, according to the second embodiment, when the printer 10 is performing print processing by direct printing, the printer 10 notifies the digital camera 20 of the wait time. After the elapse of the wait time, connection processing between the apparatuses is executed. Since the first communication control unit 301 (the digital camera 20 as the connection request source) need not transmit an unnecessary connection request, power consumption can be reduced. Stopping power supply associated with communication control until the wait time to the connection has elapsed further saves the power.

When the wait time to the connection is displayed, the user can determine, by referring to the wait time, whether he/she should wait for or stop the connection. This increases the convenience.

Typical embodiments of the present invention have been described above. However, the present invention is not limited to the aforementioned and illustrated embodiments, and can be properly modified without departing from the scope of the invention.

In the above-described embodiment, a case in which a connection request and connection response are used for processing of establishing a connection of the first communication control unit (201, 301), and a disconnection notification is used for a disconnection method has been explained as an example. The connection procedure and disconnection procedure, however, are not limited to these. The procedures comply with a connection procedure and disconnection procedure which are defined in communication protocols to be used, as a matter of course. As the first protocol controlled by the first communication control unit, a wireless communication protocol such as a wireless USB, IEEE802.11 wireless LAN, Bluetooth, and RFID (Radio Frequency IDentification) can be used. In addition, for example, close proximity wireless transfer (noncontact close proximity communication) such as NFC (Near Field Communication) and TransferJet, and wired communication such as a USB may be used. As the second communication protocol controlled by the second communication control unit, an image transfer protocol such as PictBridge, PTP (Picture Transfer Protocol), and FTP (File Transfer Protocol) can be used.

In the above embodiments, an example has been described in which after the connection processing of the second communication control unit 202 has been executed, the second communication control unit 202 transmits an image acquiring request (e.g., S424 in FIG. 4A). However, the present invention is not limited to this. More specifically, the present invention is applicable to a sequence based on the specifications of direct printing to be executed between the printer 10 and the digital camera 20. For example, after the connection processing of the second communication control unit 202, both the printer 10 and the digital camera 20 perform authentication processing. After that, the image acquiring request sequence from the printer 10 side may start. Alternatively, a print start request transmitted from the digital camera 20 may trigger the image acquiring request sequence from the printer 10 side.

Although the image supply apparatus 20 and the image output apparatus 10 have been explained as examples in the above-described embodiment, an apparatus which is supplied with an image need not be the image output apparatus 10. An information processing apparatus may be used.

The present invention can adopt embodiments in the forms of, for example, a system, apparatus, method, program, and storage medium. The present invention may be applied to either a system constituted by a plurality of devices, or an apparatus consisting of a single device.

According to the present invention, connection processing between communication apparatuses during control of communication relating to an image is improved. This improves the user convenience as compared to any system without the above-described arrangement.

(Other Embodiments)

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-278613 filed on Oct. 29, 2008, which is hereby incorporated by reference herein in its entirety.

The invention claimed is:

1. A communication system including a plurality of image supply apparatuses and an image output apparatus, each of the plurality of image supply apparatuses and the image output apparatus comprising:
   a first communication control unit configured to control communication using a first protocol;
   a second communication control unit configured to control communication relating to an image using a second protocol; and
   a link control unit configured to perform control associated with a connection of communication by said first communication control unit and said second communication control unit,
   wherein if communication with a first image supply apparatus using the first protocol is disconnected before completion of output processing of an image supplied from the first image supply apparatus under communication control by said second communication control unit, and a second image supply apparatus requests a connection, said link control unit of the image output apparatus establishes a connection of communication with the second image supply apparatus using the first protocol and holds a connection to the second image supply apparatus using the second protocol until the completion of the output processing of the image.

2. The system according to claim 1, wherein if the output processing of the image is completed during holding of the connection, said link control unit of the image output apparatus permits the held connection to the second image supply apparatus using the second protocol.

3. The system according to claim 1, wherein the second image supply apparatus further comprises a display unit configured to display "connection waiting" when the second image supply apparatus requests the connection from the image output apparatus, and the connection of the communication using the second protocol is held.

4. The system according to claim 2, wherein the second image supply apparatus further comprises a display unit configured to display "connection waiting" when the second image supply apparatus requests the connection from the image output apparatus, and the connection of the communication using the second protocol is held, and to display "connection processing" when the connection to the image output apparatus using the second protocol is established.

5. A communication system including a plurality of image supply apparatuses and an image output apparatus, each of the plurality of image supply apparatuses and the image output apparatus comprising:
- a first communication control unit configured to control communication using a first protocol;
- a second communication control unit configured to control communication relating to an image using a second protocol; and
- a link control unit configured to perform control associated with a connection of communication by said first communication control unit and said second communication control unit,
- wherein if communication with a first image supply apparatus using the first protocol is disconnected before completion of output processing of an image supplied from the first image supply apparatus under communication control by said second communication control unit, and a second image supply apparatus requests a connection, said link control unit of the image output apparatus transmits, to the second image supply apparatus by communication using the first protocol, time information representing a wait time until the connection is permitted.

6. The system according to claim 5, wherein the second image supply apparatus further comprises a timer unit configured to count a time upon receiving a notification of the time information representing the wait time by the communication using the first protocol, and
- wherein when said timer unit has counted a time corresponding to the wait time, said link control unit of the second image supply apparatus establishes the connection of the communication with the image output apparatus using the first protocol and then establishes the connection of the communication with the image output apparatus using the second protocol.

7. The system according to claim 6, wherein the second image supply apparatus further comprises a display unit configured to display the time counted by said timer unit as well as "connection waiting" upon receiving the notification of the time information representing the wait time by the communication using the first protocol.

8. The system according to claim 5, wherein the time information representing the wait time until the connection is permitted indicates a time until the output processing of the image is completed.

9. A communication apparatus comprising:
- a first communication control unit configured to control communication using a first protocol;
- a second communication control unit configured to control communication relating to an image using a second protocol;
- an output unit configured to perform output processing of an image transmitted from an image supply apparatus under communication control by said second communication control unit; and
- a link control unit configured to perform control associated with a connection of communication by said first communication control unit and said second communication control unit,
- wherein if communication with a first image supply apparatus using the first protocol is disconnected before completion of the output processing, by said output unit, of the image transmitted from the first image supply apparatus, and a second image supply apparatus requests a connection, said link control unit establishes a connection of communication with the second image supply apparatus using the first protocol and holds a connection to the second image supply apparatus using the second protocol until the completion of the output processing of the image.

10. A communication apparatus comprising:
- a first communication control unit configured to control communication using a first protocol;
- a second communication control unit configured to control communication relating to an image using a second protocol;
- an output unit configured to perform output processing of an image transmitted from an image supply apparatus under communication control by said second communication control unit; and
- a link control unit configured to perform control associated with a connection of communication by said first communication control unit and said second communication control unit,
- wherein if communication with a first image supply apparatus using the first protocol is disconnected before completion of the output processing, by said output unit, of the image transmitted from the first image supply apparatus, and a second image supply apparatus requests a connection, said link control unit transmits, to the second image supply apparatus by communication using the first protocol, time information representing a wait time until the connection is permitted.

11. A communication processing method for an image output apparatus, the method comprising:
- a first communication control step of controlling communication using a first protocol;
- a second communication control step of controlling communication relating to an image using a second protocol; and
- a link control step for performing control associated with a connection of communication in the first communication control step and the second communication control step,
- wherein in the link control step, if communication with a first image supply apparatus using the first protocol is disconnected before completion of output processing of an image supplied from the first image supply apparatus under communication control in the second communication control step, and a second image supply apparatus requests a connection, a connection of communication with the second image supply apparatus using the first protocol is established, and a connection to the second image supply apparatus using the second protocol is held until the completion of the output processing of the image.

12. A communication processing method for an image output apparatus, the method comprising:

a first communication control step of controlling communication using a first protocol;

a second communication control step of controlling communication relating to an image using a second protocol; and a link control step for performing control associated with a connection of communication in the first communication control step and the second communication control step, wherein in the link control step, if communication with a first image supply apparatus using the first protocol is disconnected before completion of output processing of an image supplied from the first image supply apparatus under communication control in the second communication control step, and a second image supply apparatus requests a connection, time information representing a wait time until the connection is permitted is transmitted to the second image supply apparatus by communication using the first protocol.

13. A non-transitory computer-readable storage medium storing a computer program which causes a computer to function as an apparatus comprising:

a first communication control unit configured to control communication using a first protocol;

a second communication control unit configured to control communication relating to an image using a second protocol; and a link control unit configured to perform control associated with a connection of communication by said first communication control unit and said second communication control unit so as to, if communication with a first image supply apparatus using the first protocol is disconnected before completion of output processing of an image supplied from the first image supply apparatus under communication control by said second communication control unit, and a second image supply apparatus requests a connection, establish a connection of communication with the second image supply apparatus using the first protocol and hold a connection to the second image supply apparatus using the second protocol until the completion of the output processing of the image.

14. A non-transitory computer-readable storage medium storing a computer program which causes a computer to function as an apparatus comprising:

a first communication control unit configured to control communication using a first protocol;

a second communication control unit configured to control communication relating to an image using a second protocol; and a link control unit configured to perform control associated with a connection of communication by said first communication control unit and said second communication control unit so as to, if communication with a first image supply apparatus using the first protocol is disconnected before completion of output processing of an image supplied from the first image supply apparatus under communication control by said second communication control unit, and a second image supply apparatus requests a connection, transmit, to the second image supply apparatus by communication using the first protocol, time information representing a wait time until the connection is permitted.

* * * * *